United States Patent [19]
Arndt et al.

[11] Patent Number: 4,774,072
[45] Date of Patent: Sep. 27, 1988

[54] PREPARATION OF ACICULAR ALPHA-$FE_2O_3$

[75] Inventors: Volker Arndt, Bobenheim-Roxheim; Bernd Meyer, Moerlenbach; Rainer Feser, Gruenstadt; Werner Steck, Ludwigshafen; Helmut Jakusch, Frankenthal, all of Fed. Rep. of Germany

[73] Assignee: BASF Aktiengesellschaft, Ludwigshafen, Fed. Rep. of Germany

[21] Appl. No.: 24,563

[22] Filed: Mar. 11, 1987

[30] Foreign Application Priority Data

Mar. 14, 1986 [DE] Fed. Rep. of Germany ....... 3608540

[51] Int. Cl.$^4$ ............................................. C01G 49/06
[52] U.S. Cl. ..................................................... 423/633
[58] Field of Search ................................ 423/633, 632

[56] References Cited

U.S. PATENT DOCUMENTS

| 4,202,871 | 5/1980 | Matsumoto et al. |
|---|---|---|
| 4,339,425 | 7/1982 | Tokvoka ............................. 423/633 |
| 4,379,183 | 4/1983 | Araki et al. |
| 4,414,196 | 11/1983 | Matsumoto et al. |
| 4,597,958 | 7/1986 | Takagi et al. ....................... 423/633 |

OTHER PUBLICATIONS

U. Schwertmann et al. Trans. Intern. Congr. Soil Sci., 9th, Adelaide 68, pp. 645–655.

Primary Examiner—Jack Cooper
Attorney, Agent, or Firm—Keil & Weinkauf

[57] ABSTRACT

Acicular $\alpha$-$Fe_2O_3$ is prepared from iron(III) salts by heating an alkaline aqueous suspension of iron(III) hydroxide in the presence of one or more organic substances which form complexes with iron(III) ions to a temperature of 100° C. or less.

4 Claims, 1 Drawing Sheet

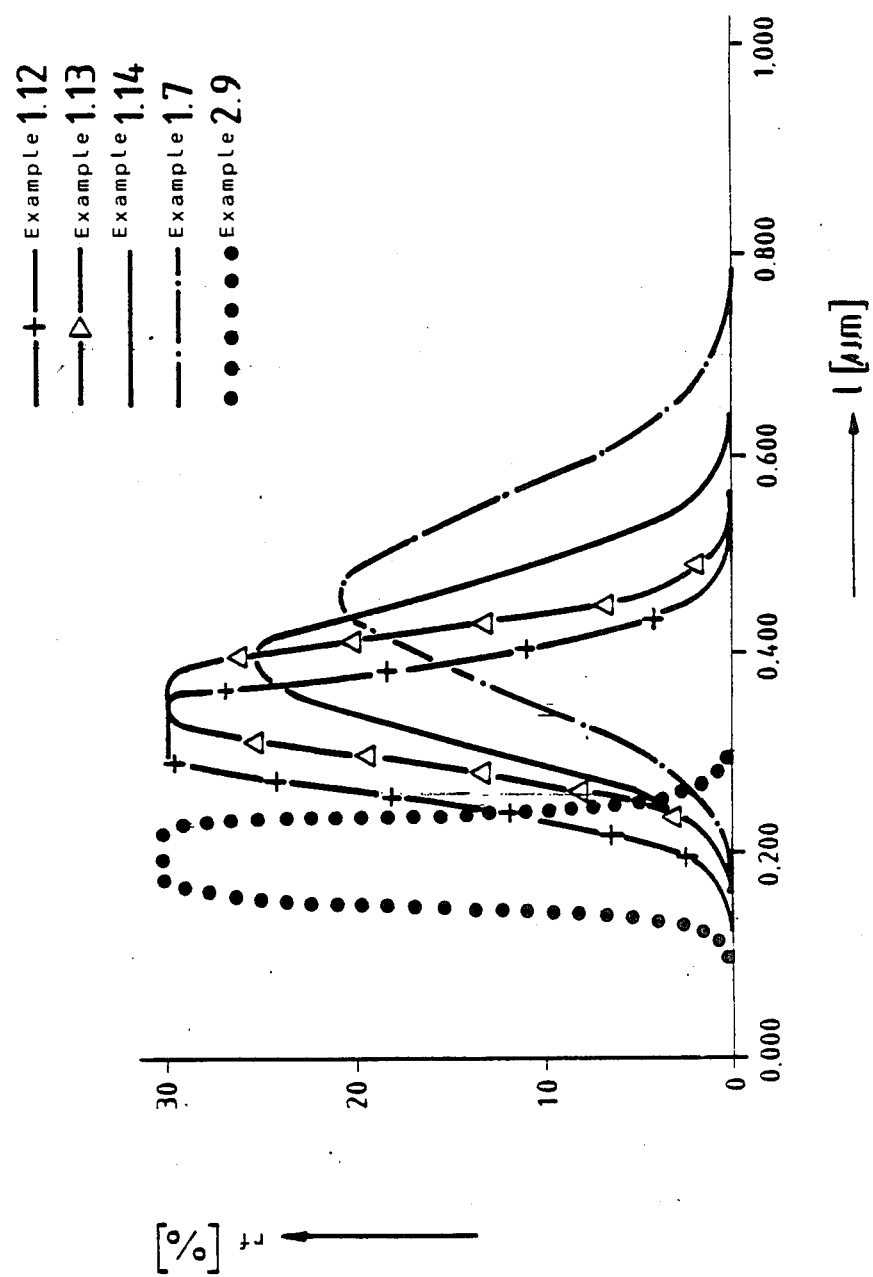

PREPARATION OF ACICULAR ALPHA-FE2O3

The present invention relates to a process for the preparation of dendrite-free and pore-free $\alpha$-Fe$_2$O$_3$ from an iron(III) salt in the presence of substances which form complexes with iron(III) ions, in alkaline suspension, at a temperature of 100° C. or less.

In order to meet the high requirements made with regard to the magnetic particles used for modern magnetic recording media, efforts have recently been made to improve the crystallographic properties of these particles. Fine holes, pores and cavities are particularly undesirable, since these have an adverse effect on the magnetic properties, as is especially the formation of dendrites, which hinder or prevent the required uniform orientation of the particles on the recording medium and reduce the packing density.

The starting material generally used for the preparation of acicular, magnetic particles is acicular $\alpha$-Fe$_2$O$_3$. This is usually obtained by dehydrating acicular $\alpha$-FeOOH or $\gamma$-FeOOH. This process has the above disadvantages, such as the formation of pores, holes and dendrites.

A process for the preparation of improved $\alpha$-Fe$_2$O$_3$ substantially without the stated disadvantages is proposed in German Laid-Open Application DOS No. 2,849,173 or DOS No. 3,146,982. According to German Laid-Open Application DOS No. 3,146,982, in particular, a product is obtained which almost meets the requirements with regard to the magnetic pigments suitable for modern recording media. According to the said application, acicular $\alpha$-Fe$_2$O$_3$ is synthesized directly from Fe(OH)$_3$ in alkaline suspension at above 100° C. in the presence of a growth regulator and $\alpha$-Fe$_2$O$_3$ seed crystals. The particular disadvantage of this process is that temperatures above 100° C. in aqueous suspensions make it necessary to use pressure reactors. Such reactors are technically complicated to construct, operate and monitor. A process of this type is also energy-consumptive and therefore expensive. Modification of this process to operate at lower temperatures, which would overcome these disadvantages, does not appear promising since according to both the literature cited and Schwertmann et al., Trans. Intern. Congr. Soil Sci., 9th, Adelaide 1968, 645-655, it has been found that in this case undesirable dendrites are formed on the $\alpha$-Fe$_2$O$_3$ and scintering occur as a result of $\alpha$-FeOOH impurities.

There was therefore great interest in a process by means of which acicular $\alpha$-Fe$_2$O$_3$ particles having the advantageous properties described in German Laid-Open Application DOS No. 3,146,982 could also be obtained at reaction temperatures below 100° C.

BRIEF DESCRIPTION OF THE DRAWING

The drawing FIGURE shows the narrow particle distribution of the resulting $\alpha$-Fe$_2$O$_3$ samples which is achievable by the novel process, i.e. the relative frequency (rf), stated in percent, as a function of the particle length (l) in $\mu$m.

It is an object of the present invention to provide acicular, dendrite-free $\alpha$-Fe$_2$O$_3$ particles which are synthesized directly at below 100° C. and therefore do not have the disadvantages described above.

We have found that this object is achieved by a process for the preparation of acicular $\alpha$-Fe$_2$O$_3$ by heating an alkaline, aqueous suspension of iron(III) hydroxide in the presence of one or more organic compounds which form complexes with iron(III) ions, if the reaction temperature in a first stage is brought to 70°–90° C. in the course of from 0.5 to 2 hours and then, in a second stage, to 90°–100° C. in the course of from 20 to 60 hours.

We have furthermore found that the tendency of $\alpha$-Fe$_2$O$_3$ to form dendrites during syntheses below 100° C. can be greatly reduced and even substantially suppressed if the iron(III) hydroxide used for the synthesis is subjected to a heat and hydrolysis treatment leading to the formation of initial $\alpha$-Fe$_2$O$_3$ seeds. This is carried out by a procedure in which the iron(III) hydroxide is heated in aqueous suspension while stirring, filtered once or, in particular, several times and resuspended. In this respect, the total amount of energy supplied, which is calculated from the duration and temperature, is critical with regard to the formation of an adequate number of advantageous seeds. For example, stirring can be carried out for a long time at a fairly low temperature and the product resuspended in cold water, or stirring can be carried out for a shorter time at a fairly high temperature and resuspension can then likewise be effected at a fairly high temperature. Furthermore, stirring for a short time at a fairly high temperature is equivalent to stirring for a long time at a low temperature. A temperature of from 15° to 60° C. has proven advantageous for this purpose. In carrying out the procedure in practice, this step can be combined with the preparation of the iron(III) hydroxide precipitate, i.e. the iron(III) hydroxide is precipitated, and the suspension obtained is stirred directly at elevated temperatures. Resuspension once or several times then replaces the washing process usually required.

It is particularly advantageous to combine both of the process steps described, since, by using the treated precipitate with a smaller tendency to dendrite formation, the synthesis temperature can be increased more rapidly, and by using the temperature profile described for syntheses with a treated precipitate, any residual tendency to dendrite formation can be suppressed. This makes the process more cost effective. In carrying out the novel process, the iron(III) salt is precipitated beforehand from aqueous solution as iron(III) hydroxide. The pH of from 7.5 to 8.0 and a temperature of about 60° C. have proven particularly advantageous for this purpose. The suspension is then stirred at elevated temperatures. Stirring at 60° C. for from 3 to 5 hours has proven advantageous. The suspension is filtered, and resuspended once or several times in cold water. If warm water is used, the stirring time is appropriately reduced. The resulting iron(III) hydroxide is resuspended in water, the complex former or formers are added and the pH is brought to 8.5–12. The iron concentration is within the usual range. Its lower limit is determined by practical considerations and the upper limit by the stirrability of the suspension. The iron concentration is advantageously brought to 0.7–1.4 mol/l. The pH is from 8.5 to 12, particularly preferably from 10.5 to 11.5. Organic substances which form chelate complexes with iron(III) ions are used as complex formers which influence the crystal shape. Particularly suitable for this purpose are $\alpha$-hydroxycarboxylic acids and organic phosphonic acids. Within these groups, citric acid, tartaric acid and 1-hydroxyethane-1,1-diphosphonic acid have proven useful. Their concentration depends on the iron concentration, the pH and the desired geometry of the end product. A total concentration of from $10^{-3}$ to $10^{-2}$ mol/l is preferred.

In the novel process, it may be advantageous in addition to add α-$Fe_2O_3$ seeds to the suspension obtained in this manner, since they have an advantageous effect on the particle size distribution, even below 100° C. Selected finely divided reaction products prepared beforehand are used as seeds.

The suspension is then heated at from 70° to 90° C. for from 0.5 to 2 hours and then at from 90° to 100° C. for from 20 to 60 hours. At this temperature, stirring is continued until the reaction is complete, which in general is the case after from 10 to 50 hours, a total time of 70 hours generally being sufficient.

When the synthesis is complete, the acicular, dendrite-free α-$Fe_2O_3$ is filtered off, washed and dried. Before being further processed, it can be provided with a shape-stabilizing coating in a conventional manner. It is then reduced to magnetite in a conventional manner in a reducing atmosphere, for example in hydrogen and/or by means of organic substances which decompose in the presence of iron oxides, it being advantageous in each case for steam to be present simultaneously in order to avoid reduction to metallic phases. Depending on the reducing agent and duration, which may be from 20 minutes to 3 hours, reduction temperatures of from 300° to 500° C. have proven suitable.

The magnetite obtained as an intermediate can be oxidized in a conventional manner with an oxidizing gas, e.g. oxygen or air, at from 250° to 350° C. Depending on the particular oxidation temperature, times of from 10 minutes to 1 hour have proven advantageous. The oxidation conditions should be chosen so that the known irreversible conversion of γ-$Fe_2O_3$ to α-$Fe_2O_3$ is avoided. Depending on the intended use, the magnetic pigment thus obtained can be modified in a conventional manner at the surface with cobalt or cobalt/iron-(II) ions to increase the coercive force.

It is also possible to reduce the starting pigment which may or may not have been shape-stabilized or modified in a conventional manner, by increasing the reduction potential beyond the stage of magnetite, and to use the resulting metallic pigment, after suitable passivation with an organic solvent, e.g. tetrahydrofuran, or by carefully passing air over it, directly as a magnetic pigment.

An important use of the magnetic pigment obtained from the α-$Fe_2O_3$ pigments prepared according to the invention is as a magnetic material in the production of magnetic recording media.

Recording media are produced in a conventional manner, and for this purpose the magnetic materials are dispersed in polymeric binders. Suitable binders for this purpose are known compounds, such as homopolymers and copolymers of vinyl derivatives, polyurethanes, polyesters and the like. The binders are used as solutions in suitable organic solvents, which may contain further additives. The magnetic layers are applied to rigid or flexible bases, such as sheets, films and cards.

The Examples which follow illustrate the invention. Percentages are by weight and are based on the overall compound. The magnetic properties of the powder samples are measured using a vibrating sample magnetometer in a magnetic field of 160 kA/m, or in a vibrating sample magnetometer after biasing in a discharge capacitor. The values of the coercive force, Hc, measured in [kA/m], were based on a tap density Q of 1.2 g/cm$^3$ for the powder measurements. The specific remanence [Mr/Q] and saturation magnetization [Mm/Q] are each stated in [nTm$^3$/g]. The saturation magnetization and remanence of tapes are stated in [mT]. The geometry of the products was determined from electron micrographs at a magnification of 1:20,000. In this respect, the term needle denotes an elongated shape and not the presence of pointed ends, i.e. also includes rectangles, etc. The specific surface area ($SN_2$) was determined according to DIN 66,132, using a Ströhlein areameter (Ströhlein, Düsseldorf, FRG) and the one-point difference method due to Haul and Dümbgen.

EXAMPLE 1

10 moles of Fe(NO$_3$)$_3$.9H$_2$O were dissolved in 30 l of water at 60° C., and 25% strength sodium hydroxide solution was added while stirring, until a pH of 7.5 was reached. The resulting suspension of iron(III) hydroxide (referred to as Fe(OH)$_3$ below) was stirred for a further 30 minutes and filtered over a suction filter. The filter cake was washed thoroughly, a little at a time, with hot water. The precipitate thus obtained was used as the starting material for the Examples below.

EXAMPLE 1.1

The precipitate obtained in Example 1 was suspended in 0.8 l of water in a plastic-lined glass vessel in an amount such that an iron concentration of 1.35 mol/l of Fe(OH)$_3$ resulted. 5.10 mmol/l of citric acid and 0.87 mmol/l of tartaric acid were added to the suspension and the pH was brought to 11.7. The ready-prepared, stirred reaction mixture was heated to 70° C. in the course of one hour and then to 100° C. in the course of 60 hours, after which stirring was continued for 20 hours at 100° C. Cooling, filtration, washing and drying gave pore-free, acicular α-$Fe_2O_3$ which was pure according to its X-ray pattern and had a mean length of 0.45 μm and a specific surface area ($SN_2$) of 15.1 m$^2$/g.

EXAMPLES 1.2 TO 1.11

Further reactions were carried out as described in Example 1.1, but with different amounts of starting materials. In addition, α-$Fe_2O_3$ seeds were added in some cases. The experiments are listed in Table 1. In each case, pore-free, acicular α-$Fe_2O_3$ which was pure according to its X-ray pattern was obtained.

TABLE 1

| Example | Iron concentration [mol/l] | pH | Complex formers* [mmol/l] | Amount of seeds [mmol/l] | $SN_2$ [m$^2$/g] | ⊥ [μm] |
|---|---|---|---|---|---|---|
| 1.2 | 1.35 | 10.2 | 0.87 Ta 2.50 Ci | 0 | 13.6 | 0.18 |
| 1.3 | 1.35 | 10.5 | 0.50 Ta 2.40 Ci | 0 | 10.8 | 0.37 |
| 1.4 | 1.35 | 11.7 | 0.87 Ta 5.10 Ci | 4 | 14.8 | 0.45 |
| 1.5 | 1.35 | 12.0 | 5.00 Ph | 0 | 12.4 | 0.40 |
| 1.6 | 1.35 | 10.0 | 3.50 Ph | 14 | 14.9 | 0.40 |
| 1.7 | 1.35 | 10.8 | 0.90 Ta 4.60 Ph | 4 | 14.8 | 0.46 |
| 1.8 | 1.35 | 10.8 | 1.40 Ta 3.80 Ph | 4 | 15.2 | 0.62 |
| 1.9 | 1.35 | 11.3 | 0.87 Ta 3.00 Ci | 4 | 16.0 | 0.24 |
| 1.10 | 1.35 | 10.8 | 0.87 Ta 2.50 Ci | 4 | 15.9 | 0.25 |
| 1.11 | 0.75 | 10.8 | 1.00 Ta 1.00 Ci 2.50 Ph | 0 | 15.3 | 0.60 |

*The following abbreviations are used in the Tables: Ta = tartaric acid, Ci = citric acid, Ph = 1-hydroxyethane-1,1-diphosphonic acid.

EXAMPLE 1.12

A precipitate obtained as described in Example 1 was suspended in 0.8 l of water so that an iron concentration of 1.35 mol/l resulted. 3.00 mmol/l of citric acid and 0.87 mmol/l of tartaric acid were added to the suspension and the pH was brought to 11.3. In addition, 4 mmol/l of $\alpha$-$Fe_2O_3$ seeds were present. The stirred reaction mixture was heated to 80° C. in the course of 2 hours and then to 100° C. in the course of 20 hours. It was stirred for a further 50 hours at 100° C., cooled, filtered and then dried. Pore-free, acicular $\alpha$-$Fe_2O_3$ which was pure according to its X-ray pattern and had a mean length of 0.32 $\mu$m and a specific surface area of ($SN_2$) of 9.7 m$^2$/g was obtained.

EXAMPLE 1.13

A precipitate obtained as described in Example 1 was suspended in 0.8 l of water so that an iron concentration of 1.35 mol/l resulted. 2.80 mmol/l of citric acid and 0.87 mmol/l of tartaric acid were added to the suspension and the pH was brought to 11.3. In addition, 4 mmol/l of $\alpha$-$Fe_2O_3$ seeds were present. The stirred reaction mixture was heated to 90° C. in the course of 2 hours and then to 100° C. in the course of 50 hours. It was stirred for a further 20 hours at 100° C., cooled, filtered and then dried. Pore-free, acicular $\alpha$-$Fe_2O_3$ which was pure according to its X-ray pattern and had a mean length of 0.35 pm and a specific surface area of ($SN_2$) of 16.0 m$^2$/g was obtained.

EXAMPLE 1.14

A precipitate obtained as described in Example 1 was suspended in 0.8 l of water so that an iron concentration of 1.35 mol/l resulted. 4.80 mmol/l of citric acid and 0.87 mmol/l of tartaric acid were added to the suspension and the pH was brought to 11.7. The stirred reaction mixture was heated to 90° C. in the course of 2 hours and then to 100° C. in the course of 50 hours. It was stirred for a further 20 hours at 100° C., cooled, filtered and then dried. Pore-free, acicular $\alpha$-$Fe_2O_3$ which was pure according to its X-ray pattern and had a mean length of 0.39 pm and a specific surface area of ($SN_2$) of 14.6 m$^2$/g was obtained.

EXAMPLE 2

5 moles of $Fe(NO_3)_3 \cdot 9H_2O$ were dissolved in 15 l of water, and 10% strength sodium hydroxide solution was added to the stirred solution at 60° C. until the pH was 8.0. The resulting $Fe(OH)_3$ suspension was stirred for a further X hours (see Table 2) at 60° C. and filtered over a filter press. The precipitate was resuspended four times in cold water and filtered off. The precipitates thus obtained were used for the syntheses below.

EXAMPLES 2.1 TO 2.7

Reactions were carried out as described in Example 1.1, but using different amounts of starting materials. In addition, 4 mmol/l of $\alpha$-$Fe_2O_3$ seeds were added. The experiments are listed in Table 2. In each case, porefree, acicular $\alpha$-$Fe_2O_3$ which was pure according to its X-ray pattern was obtained.

TABLE 2

| Example | X [h] | Iron concentration [mol/l] | pH. | Complex former* [mol/l] | $SN_2$ [m$^2$/g] | ⊥ [μm] |
|---|---|---|---|---|---|---|
| 2.1 | 7 | 1.35 | 10.8 | 0.87 Ta | 18.3 | 0.21 |
| 2.2 | 5 | 1.35 | 11.3 | 2.55 Ci 0.87 Ta | 17.4 | 0.25 |
| 2.3 | 5 | 1.35 | 10.8 | 3.00 Ci 0.87 Ta | 15.6 | 0.27 |
| 2.4 | 5 | 0.75 | 10.8 | 2.50 Ci 3.30 Ph | 20.7 | 0.30 |
| 2.5 | 5 | 0.75 | 10.8 | 3.10 Ph | 21.1 | 0.22 |
| 2.6 | 4 | 1.35 | 10.8 | 0.80 Ta 4.00 Ph | 17.1 | 0.45 |
| 2.7 | 4 | 1.35 | 10.8 | 2.00 Ci 1.40 Ta 4.00 Ph | 16.8 | 0.39 |

EXAMPLE 2.8

A precipitate obtained as described in Example 2 was stirred for 7 hours at 60° C. and then suspended in 0.8 l of water so that an iron concentration of 0.75 mol/l resulted. 3.10 mmol/l of 1-hydroxyethane-1,1-diphosphonic acid were added to the suspension and the pH was brought to 10.8. In addition, 4 mmol/l of $\alpha$-$Fe_2O_3$ seeds were present. The reaction mixture was heated to 70° C. in the course of 1 hour and then to 100° C. in the course of 20 hours. It was stirred for a further 50 hours at 100° C., cooled, filtered and then dried. A pore-free, acicular $\alpha$-$Fe_2O_3$ which was pure according to its X-ray pattern and had a mean length of 0.25 $\mu$m and a specific surface area ($SN_2$) of 11.2 m$^2$/g was obtained.

EXAMPLE 2.9

A precipitate obtained as described in Example 2 was stirred for 4 hours at 60° C. and then suspended in 0.8 l of water so that an iron concentration of 1.35 mol/l resulted. 3.00 mmol/l of citric acid and 0.87 mmol/l of tartaric acid were added to the suspension and the pH was brought to 11.3. In addition, 4 mmol/l of $\alpha$-$Fe_2O_3$ seeds were present. The reaction mixture was heated to 90° C. in the course of 2 hours and then to 100° C. in the course of 20 hours. It was stirred for a further 50 hours at 100° C., cooled, filtered and then dried. A pore-free, acicular $\alpha$-$Fe_2O_3$ which was pure according to its X-ray pattern and had a mean length of 0.19 $\mu$m and a specific surface area ($SN_2$) of 11.7 m$^2$/g was obtained.

EXAMPLE 3

5 moles of $Fe(NO_3)_3 \cdot 9H_2O$ were dissolved in 15 l of water and 10% sodium hydroxide solution was added to the stirred solution at 60° C. until the pH was 8.0. The resulting $Fe(OH)_3$ suspension was stirred for a further 0.5 hour at 60° C. and filtered over a filter press. The precipitate was resuspended four times in hot water and filtered off. This precipitate was used to carry out the synthesis in which the iron content was 1.35 mol/l. 5.00 mmol/l of of 1-hydroxyethane-1,1-diphosphonic acid were added and the pH was brought to 11.3. In addition, 14 mmol of $\alpha$-$Fe_2O_3$ seeds were present. The stirred reaction mixture was heated to 70° C. in the course of one hour and then to 100° C. in the course of 60 hours. It was stirred for a further 20 hours at 100° C., cooled, filtered, washed and then dried. Pore-free, acicular $\alpha$-$Fe_2O_3$ which was pure according to its X-ray pattern and had a mean length of 0.53 $\mu$m and a specific surface area ($SN_2$) of 14.8 m$^2$/g was obtained.

EXAMPLE 4.1

The product from Example 1.4 was provided with a coating of 0.5% of phosphate by heating in dilute phosphoric acid and was then filtered off and dried, after which 2.5% of stearic acid were added and reduction was carried out in a rotary tubular furnace for 30 minutes at 450° C. in a 1:1 hydrogen/nitrogen stream to give magnetite. Before entering the reaction tube, the $H_2$ stream was passed through water at from 60° to 80° C. When the reduction was complete, the magnetite sample was oxidized with air to $\gamma$-$Fe_2O_3$ in the course of 30 minutes at 280° C. in a furnace of the same design. The ready-prepared product had a coercive force of 22.6 kA/m and a specific remanence of 39.9 $nTm^3/g$.

EXAMPLE 4.2

The product from Example 1.1 was provided with a coating of 0.5% of phosphate by heating in dilute phosphoric acid and was filtered off, dried, and melted as described in Example 4.1. The $\gamma$-$Fe_2O_3$ was suspended in water containing cobalt ions and its surface was modified with 1.2% of Co by precipitation with sodium hydroxide solution and stirring for 4 hours at 95° C. The ready-prepared magnetite pigment had a coercive force of 27.1 kA/m and a specific remanence of 39.4 $nTm^3/g$.

EXAMPLE 4.3

The product from Example 1.14 was converted as described in Example 4.1, but at a reduction temperature of 430° C. The ready-prepared product had a coercive force of 23.6 kA/m and a specific remanence of 43.7 $nTm^3/g$.

EXAMPLE 4.4

The product from Example 1.13 was converted as described in Example 4.1, but at a reduction temperature of 400° C. The $\gamma$-$Fe_2O_3$ was suspended in water containing cobalt ions and its surface was modified with 0.6% of Co by precipitation with sodium hydroxide solution and stirring for 4 hours at 95° C. It was filtered off, dried, and heated under nitrogen for 1 hour at 220° C. The ready-prepared magnetic pigment had a coercive force of 26.8 kA/m and a specific remanence of 43.4 $nTm^3/g$.

We claim:

1. A process for the preparation of dendrite free acicular $\alpha$-$Fe_2O_3$ comprising adding to an alkaline aqueous suspension of iron(III) hydroxide at least one organic compound which forms a complex with iron(III) ions, said organic compound being selected from the group consisting of $\alpha$-hydroxycarboxylic acids and organic phosphonic, acids, heating during a first stage wherein the reaction temperature is brought to 70°–90° C. over a course of from 0.5 to 2 hours and then heating during a second stage wherein the reaction temperature is brought to 90°–100° C. over a course of from 20 to 60 hours, said reaction temperature in the second stage being greater than said reaction temperature in the first stage; wherein prior to the addition of said at least one organic compound which forms a complex with iron (III) ions, the alkaline aqueous suspension of iron (III) hydroxide is filtered to obtain an iron (III) hydroxide precipitate, the precipitate is suspended one or more times in water while stirring at a temperature not exceeding 100° C., filtered again to obtain said precipitate and resuspended in water to form an alkaline aqueous suspension of iron (III) hydroxide.

2. The process of claim 1 wherein the pH of the suspension is from 8.5 to 12.

3. The process of claim 1 wherein the filtration and resuspension of the iron(III) hydroxide precipitate is carried out at from 15° to 60° C.

4. The process of claim 1 further comprising adding $\alpha$-$Fe_2O_3$ seeds to the alkaline aqueous suspension of iron(III) hydroxide at a temperature not exceeding 100° C., prior to adding said at least one organic compound which forms a complex with iron(III) ions.

* * * * *